July 18, 1967 W. E. KELLEY 3,331,569
INSERT FOR PNEUMATIC TUBE SYSTEM CARRIER
Filed April 20, 1966
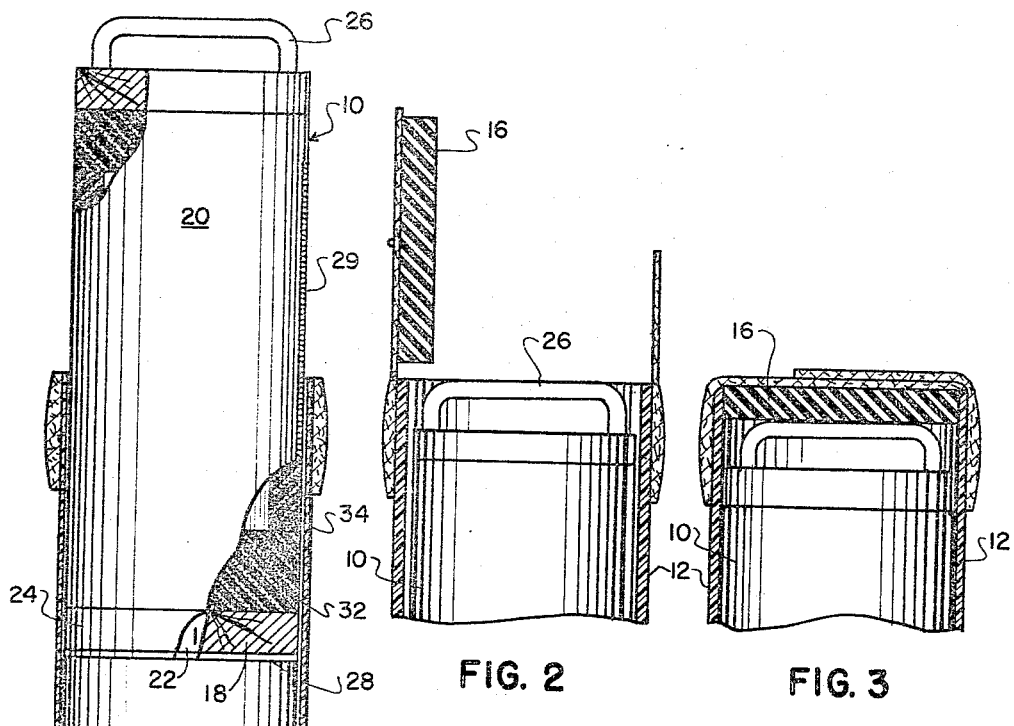
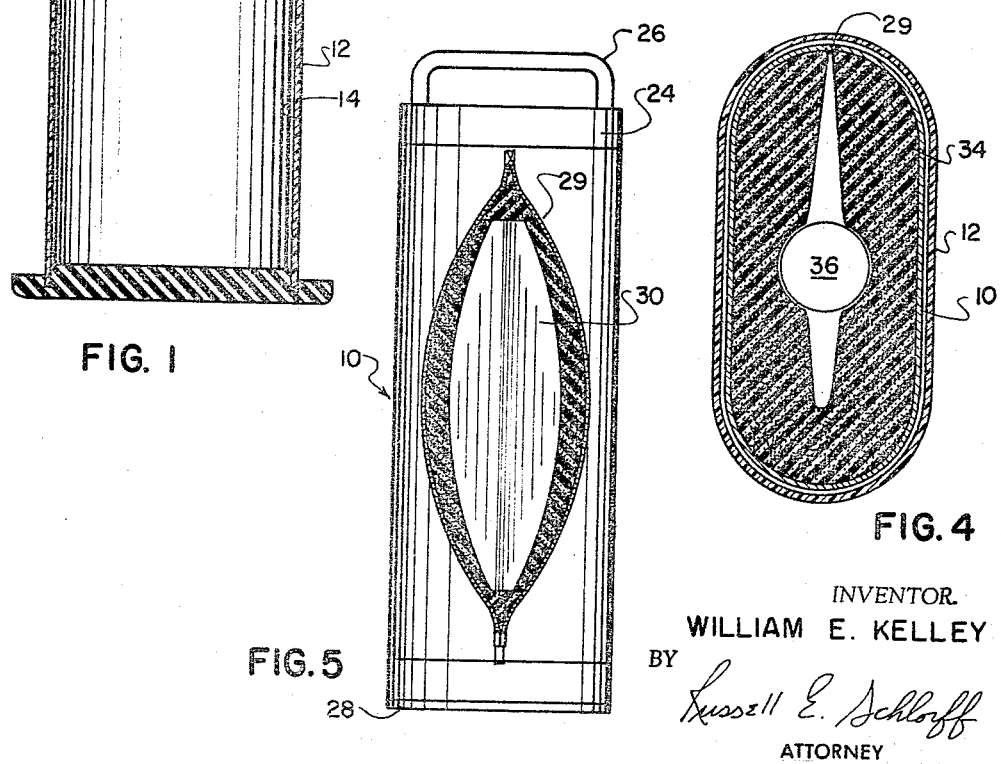
INVENTOR.
WILLIAM E. KELLEY
BY
Russell E. Schloff
ATTORNEY United States Patent Office 3,331,569
Patented July 18, 1967

3,331,569
INSERT FOR PNEUMATIC TUBE SYSTEM
CARRIER
William E. Kelley, 14203 Candleshade Lane,
Houston, Tex. 77045
Filed Apr. 20, 1966, Ser. No. 543,931
4 Claims. (Cl. 243—35)

This invention relates to pneumatic tube systems, and more particularly to an insert for a pneumatic tube system carrier which eliminates breakage of fragile items transported by the pneumatic tube system.

Pneumatic tube systems are used in various installations to speedily deliver materials from one location in the installation to another. The material to be transported is placed in a carrier which speedily travels through the conduits making up the system. During its travel, the carrier is subject to many changes in direction and acceleration. Such changes cause the material within the carrier to slide around considerably and if the material is fragile there will be a tendency for the material to break. This difficulty is particularly apparent in hospitals where it is desirable to use the pneumatic tube system for the delivery of medicine and other items contained in breakable vials and bottles. It has been found that due to the tortuous trip through the tube system breakage of bottles and vials is high and even if the bottles do not break the medicine, particularly pills, will often powder. One reason for powdering of pills is that the medicine container is not confined in the carrier and therefore slides around as the carrier progresses through the tube system.

In an effort to remedy this situation, some hospitals stuff paper, rubber or cotton around the medicine container. Even so the pills still often crumble because there is insufficient stuffing to eliminate movement of the container within the carrier. Removable sleeves of lambs wool and rubber have also been tried without very satisfactory results since again the container was not sufficiently confined to prevent movement. One method which has been found satisfactory has been providing the inside of the carrier with a foam liner which will compress and form itself around the container, thereby confining the container and preventing movement. However, such liners can only be utilized in side opening carriers and cannot be employed in numerous types of end opening carriers which are in common use. Also, lined carriers being special items are expensive to manufacture and have a limited capacity when used for operations not involving fragile articles.

It is an object of the present invention to provide an insert for a pneumatic tube system carrier which will confine fragile items placed in the carrier thereby containing such article during transport.

It is another object to provide an insert for a pneumatic tube system carrier having a removable liner of compressible material which will securely confine any material placed in the insert.

It is a further object to provide an insert for a pneumatic tube system carrier which is so designed that upon the insert being positioned in the carrier, the insert will be compressed slightly, thereby closely engaging the interior of the carrier.

The insert of the present invention is generally comprised of a pair of end members having the configuration of the interior cross section of the carrier and a tube of flexible material having a longitudinal opening therein. An end member is inserted into each end of the tube and attached thereto giving the insert the general configuration of the interior of the carrier. Inside the insert is a liner of compressible material which will mold itself about any article placed in the insert thereby confining the material during transport through the pneumatic tube system.

FIG. 1 is a pictorial view of an insert of the present invention being positioned in a carrier, the carrier being in section to aid in illustration.

FIG. 2 is a view similar to FIG. 1 with the insert fully in the carrier.

FIG. 3 is a view similar to FIG. 2 with the carrier closed.

FIG. 4 is a transverse cross section view through insert and carrier showing how the liner molds itself about the contents of the insert.

FIG. 5 is a pictorial view of the insert showing the interior of the insert.

Referring now to the drawings, the novel insert 10 of the present invention is shown being positioned in an end-opening pneumatic tube system 12 as seen in FIG. 1. As can be seen, the carrier 12 has a hollow interior 14 in which material to be transported by the pneumatic tube system is deposited. The carrier 12 has an end-closure member 16 which opens and closes the interior 14 of the carrier 12. Normally, material is deposited in the interior 14 of the carrier 12 and the carrier is then put into the pneumatic tube system and travels through conduits forming the pneumatic tube system from one station to another. In route, the carrier will be subject to many changes in direction and acceleration. Unless the material in the carrier is contained, the various changes in direction and acceleration will shift the material in the carrier and if the material is fragile, there will be a tendency for it to break. The purpose of the insert 10 is to sufficiently contain material and prevent movement relative to the carrier so that such material will not be damaged during transport.

As can be seen, the insert 10 has the cross sectional configuration mating with the interior 14 of the carrier 12. In order to obtain this, the insert 10 has a pair of end members 18, 18, formed of solid material such as wood. Each end member 18 has the configuration of the cross section of the interior 14 of the carrier 12 for which the insert is designed. Therefore, the end members 18 for an insert to be used in a cylindrical carrier will be round and the end members for a carrier having an oval interior configuration will be oval.

A tube 20 of flexible material such as the various tough, hard-wearing vinyl plastics, forms the body of the insert 10. The tube 20 may be formed from a sheet of material having the desired length and a width equal in length to the circumference of the end member 18. The sides of the sheet are joined together by sewing or other means of attaching to form the tube 20. An end portion 22 of the tube 20 is telescoped over each of the end members 18, 18. The end portions 22, 22 are attached to the end members by tacking, stapling, gluing, or other well known means. A band 24 of tape may be used to cover the heads of the attaching means. Since the end members 18, 18 have the same configuration as the interior cross section of the carrier and the tube 20 of flexible material is attached thereto, the insert 10 also has the general shape of the interior 14 of the carrier 12.

One of the end members 18 is provided with a handle 26 to aid in the withdrawal of the insert 10 from the carrier 12. If desired, felt pads 28 may be attached to the outside of one or both of the end members 18. The felt pads 28 will act to cushion the insert 10.

The tube 20 is provided with a longitudinal slot 29 which extends from adjacent one end member 18 to a point adjacent the other end member 18. A layer of material may be used to reinforce the opening and a zipper is attached to control opening and closing thereof. The opening 29 provides means for insertion and withdrawal of material from the interior of the insert.

Located in the interior of the insert 10 is a liner 30 of compressible material such as urethane foam. The liner 30 may be formed of two end blocks 32—32 and a folded body member 34 having the opening formed by the abutting sides opposite the longitudinal opening 29 in the tube 20. The body member 34 extends from end block 32 to the other end block 32.

All three sections forming the liner 30 are simply placed in position and, therefore, the liner 30 may be easily removed for sterilization. The material 36 to be transported by the pneumatic tube system is placed inside the insert 10 and the opening 29 closed by the zipper. The insert 10 is then placed in the carrier 12. Since the end members 18 are slightly smaller than the interior 14 of the carrier 12, the insert 10 will slide into the carrier 12 without any difficulty.

The length of the insert 10 is approximately the same as the length of the interior 14 of the carrier 12 for which it is designed, as seen in FIG. 2. The end closure member 16 has a portion which extends into the interior 14 and, therefore, when the end member 18 is closed, the end closure member 16 will bear upon the insert 10 causing the sides of the insert 10 to swell slightly, thereby causing the side walls of the insert to engage the interior wall of the carrier confining the insert, as seen in FIG. 3.

Since the insert 10 is confined by the interior wall of the carrier, the insert 10 will not move during transport. The material to be transported is confined by the compressible liner 30 and, therefore, it will not slide around, as seen in FIG. 4. The liner 30 being formed of compressible material acts as a shock absorber and also confines the material so that it will not move during the tortuous trip of the carrier through the tube system. In addition to confining and restraining the material 36, the liner 30, since it fully surrounds the material 36, acts as a cushion or shock absorber protecting the container and the material therein from any shocks that it may receive as the carrier 12 progresses throughout the pneumatic tube system. It has been found that fragile articles such as pills and other medicine can be safely transported by using the insert 10 of the present invention.

I claim:

1. An insert for a pneumatic tube carrier, the carrier having a hollow interior and an end closure member closing the interior, said insert comprising:

a pair of end members, each end member having the configuration of the interior cross section of the carrier,
   a tube of flexible material,
   a longitudinal opening in the wall of the tube for inserting and withdrawing material from the interior of the insert,
   means to open and close the opening, said opening extending from adjacent one end member to a point adjacent the other end member and the opening and closing of said opening is controlled by fastening means,
   an end portion of the tube telescoped over each of the end members, the end portions of the tube attached to their respective end members, thereby giving the insert the general shape of the inside of the carrier,
   means on one of the end members facilitating withdrawal of the insert from the carrier,
   a liner of compressible material inside the tube,
   the dimensions of the insert being such that the insert is tightly confined by the interior of the carrier.

2. The insert specified in claim 1 characterized in that the length of the insert is approximately the same length as the open interior of the carrier. Therefore, when the carrier is closed, the closure member will press upon the insert causing the sides of the insert to swell out slightly thereby engaging the walls of the carrier.

3. The insert specified in claim 2 in which the fastening means to open and close said opening is a zipper.

4. The insert specified in claim 3 in which the liner is formed of two blocks of compressible material, one at each end of the tube and a third piece of compressible material between the end blocks of compressible material, the third piece being folded with the opening between its sides being opposite the longitudinal opening in the tube.

References Cited

UNITED STATES PATENTS

| | | | |
|---|---|---|---|
| 1,870,258 | 8/1932 | MacMillan | 243—35 |
| 3,072,362 | 1/1963 | Allen | 243—35 |

EVON C. BLUNK, *Primary Examiner.*

H. C. HORNSBY, *Assistant Examiner.*